(12) United States Patent
Hubbell

(10) Patent No.: US 11,609,019 B2
(45) Date of Patent: Mar. 21, 2023

(54) DEVICE AND METHOD FOR CONTROLLING AN ORIFICE OF A VALVE IN AN HVAC SYSTEM

(71) Applicant: BELIMO HOLDING AG, Hinwil (CH)

(72) Inventor: Richard Hunter Hubbell, Lowell, MA (US)

(73) Assignee: BELIMO HOLDING AG, Hinwil (CH)

(*) Notice: Subject to any disclaimer, the term of this patent is extended or adjusted under 35 U.S.C. 154(b) by 0 days.

(21) Appl. No.: 17/292,831

(22) PCT Filed: Oct. 23, 2019

(86) PCT No.: PCT/EP2019/078820
§ 371 (c)(1),
(2) Date: May 11, 2021

(87) PCT Pub. No.: WO2020/114668
PCT Pub. Date: Jun. 11, 2020

(65) Prior Publication Data
US 2021/0396418 A1   Dec. 23, 2021

(30) Foreign Application Priority Data
Dec. 5, 2018 (CH) .................... 01496/18

(51) Int. Cl.
*F24F 140/20* (2018.01)
*F24F 11/63* (2018.01)
(Continued)

(52) U.S. Cl.
CPC ............. *F24F 11/63* (2018.01); *F24F 11/84* (2018.01); *G05B 19/042* (2013.01); *F24F 2140/20* (2018.01); *G05B 2219/2614* (2013.01)

(58) Field of Classification Search
CPC .......... F24F 11/63; F24F 11/84; F24F 140/20; F24F 11/62; G05B 19/042
See application file for complete search history.

(56) References Cited

U.S. PATENT DOCUMENTS 6,352,106 B1   3/2002   Hartman
10,465,932 B2   11/2019   Guidetti et al.
(Continued)

FOREIGN PATENT DOCUMENTS

CN   101256020 A   9/2008
CN   106837825 A   6/2017
(Continued)

OTHER PUBLICATIONS

Office Action dated Mar. 10, 2022 by the Chinese Patent Office in Chinese Application No. English 201980080495.4.
(Continued)

*Primary Examiner* — Michael W Choi
(74) *Attorney, Agent, or Firm* — Sughrue Mion, PLLC

(57) ABSTRACT

For controlling an orifice of a valve (10) in an HVAC system (100) to regulate the flow (Φ) of a fluid through a thermal energy exchanger (2) of the HVAC system (100) and adjust the energy transfer rate (Q̇) of the thermal energy exchanger (2) in response to a demand value (d), the orifice of the valve (10) is controlled in a first mode of operation where the flow (Φ) of the fluid through the thermal energy exchanger (2) is regulated within efficiency constraints on the energy transfer rate (Q̇) with respect to an efficiency threshold value. Upon receiving an override signal (OS), the orifice of the valve (10) is controlled in a second mode of operation where the flow (Φ) of the fluid through the thermal energy exchanger (2) is not regulated with respect to the first efficiency threshold value.

13 Claims, 5 Drawing Sheets

(51) Int. Cl.
    *F24F 11/84*    (2018.01)
    *G05B 19/042*   (2006.01)

(56)             References Cited

U.S. PATENT DOCUMENTS

2003/0213851 A1*  11/2003  Burd ................. G05D 23/1902
                                                          236/51
2014/0097367 A1    4/2014  Burt
2016/0054741 A1*   2/2016  Thuillard ........... G05D 23/1919
                                                         700/276
2017/0067662 A1    3/2017  Guidetti et al.
2018/0313561 A1   11/2018  Sinha et al.

FOREIGN PATENT DOCUMENTS

CN          108644984 A      10/2018
DE     10 2009 004 319 A1     7/2010
EP           3 141 823 A1     3/2017
GB             2522269 A      7/2015

OTHER PUBLICATIONS

International Search Report for PCT/EP2019/078820 dated Jan. 31, 2020 (PCT/ISA/210).
Written Opinion for PCT/EP2019/078820 dated Jan. 31, 2020 (PCT/ISA/210).
Office Action dated Sep. 5, 2022 in Chinese Application No. 201980080495.4.

* cited by examiner

DEVICE AND METHOD FOR CONTROLLING AN ORIFICE OF A VALVE IN AN HVAC SYSTEM

CROSS REFERENCE TO RELATED APPLICATIONS

This application is a National Stage of Application No. PCT/EP2019/078820 filed Oct. 23, 2019, claiming priority based on Swiss Patent Application No. 01496/18 filed Dec. 5, 2018, the entire contents of each of which being herein incorporated by reference in their entireties.

FIELD OF THE INVENTION

The present invention relates to a method and devices for controlling an orifice of a valve in a Heating, Ventilating and Air Conditioning (HVAC) system. Specifically, the present invention relates to a method, a control system, and a computer program product for controlling the orifice of a valve in an HVAC system to regulate the flow of a fluid through a thermal energy exchanger of the HVAC system and to adjust the energy transfer rate of the thermal energy exchanger in response to a demand value.

BACKGROUND OF THE INVENTION

By regulating the flow of fluid through a thermal energy exchanger of an HVAC system, it is possible to adjust the amount of energy exchanged by the thermal energy exchanger, e.g. to adjust the energy transfer rate of a thermal energy exchanger to heat or cool a room in a building. While the fluid transport through the fluid circuit of the HVAC system is driven by one or more pumps, the flow is typically regulated by varying the orifice (opening) or position of valves, e.g. manually or by way of actuators. It is known that the efficiency of thermal energy exchangers is reduced at high flow rates where the fluid rushes at an increased rate through the thermal energy exchangers, without resulting in a significant increase in energy exchange.

U.S. Pat. No. 6,352,106 describes a self-balancing valve having a temperature sensor for measuring the temperature of a fluid passing through the valve. According to U.S. Pat. No. 6,352,106, the range and thus the maximum opening of the valve are adjusted dynamically, depending on the measured temperature. The opening of the valve is modulated based on a stored temperature threshold value, the current fluid temperature, and a position command signal from a load controller. Specifically, the opening range of the valve is set periodically by a position controller, based on a temperature threshold value stored at the position controller, the current fluid temperature, and the difference between the previously measured fluid temperature and the current fluid temperature. U.S. Pat. No. 6,352,106 further describes an alternative embodiment with two temperature sensors, one placed on the supply line and the other one placed on the return line, for measuring the actual differential temperature over the load, i.e. the thermal energy exchanger. According to U.S. Pat. No. 6,352,106, in this alternative embodiment, the threshold temperature is a threshold differential temperature across the load determined by system requirements of the load. Thus, U.S. Pat. No. 6,352,106 describes controlling the flow based on a change in fluid temperature or a change in a differential temperature over the load. Accordingly, the flow is controlled based on a comparison of determined temperature changes to fixed threshold temperatures or threshold differential temperatures, respectively, which must be predefined and stored at the valve's position controller. Consequently, to avoid incorrect and inefficient settings of the valve, it must be ensured, at initial installation time of the system and whenever thermal energy exchangers are replaced with new models, that the stored threshold temperatures or threshold differential temperatures, respectively, match the type and design parameters of thermal energy exchangers used in the HVAC system.

Document DE 10 2009 004319 discloses a method for operating a heating or cooling system, whereby the temperature difference between supply temperature and return temperature or only the return temperature is controlled, so that hydraulic balancing of each heat exchanger of the heating or cooling system is achieved depending on temperature values. The balancing is newly adjusted and optimized at each changing of the operation conditions. Although a temperature difference between supply temperature and return temperature is used for control, there is neither a flow meter disclosed, nor the measurement of an energy flow through the heat exchanger, nor the determination of the functional dependency of the energy flow from the mass flow of the heating or cooling medium.

SUMMARY OF THE INVENTION

It is an object of this invention to provide a method, a control system, and a computer program product for controlling the orifice of a valve in an HVAC system, which method, control system, and computer program product do not have at least some of the disadvantages of the prior art. In particular, it is an object of the present invention to provide a method, a control system, and a computer program product for controlling the orifice of a valve in an HVAC system to regulate the flow of a fluid through a thermal energy exchanger of the HVAC system and to adjust the energy transfer rate of the thermal energy exchanger in response to a demand value.

According to the present invention, these objects are achieved through the features of the independent claims. In addition, further advantageous embodiments follow from the dependent claims and the description.

According to the present invention, the above-mentioned objects are particularly achieved in that for controlling the orifice (or position or opening) of a valve in an HVAC system to regulate the flow of a fluid through a thermal energy exchanger of the HVAC system and adjust the energy transfer rate of the thermal energy exchanger in response to a demand value, the orifice of the valve is controlled in a first mode of operation where the flow of the fluid through the thermal energy exchanger is regulated within efficiency constraints on the energy transfer rate with respect to a first efficiency threshold value, the efficiency constraints being determined by comparing a temperature difference $\Delta T = T_{in} - T_{out}$, between a supply temperature $T_{in}$ of the fluid entering the thermal energy exchanger and a return temperature $T_{out}$ of the fluid exiting the thermal energy exchanger, to the first efficiency threshold value; and, upon receiving an override signal, controlling the orifice of the valve in a second mode of operation where the flow of the fluid through the thermal energy exchanger is not regulated with respect to the first efficiency threshold value.

One skilled in the art will understand that depending on the criteria or parameter(s) used to define and/or determine "efficiency", a respective "efficiency threshold" may define a state or process efficient for respective parameter values below or above said "efficiency threshold".

In an embodiment, controlling the orifice of the valve in the second mode of operation comprises regulating the flow of the fluid through the thermal energy exchanger within the efficiency constraints on the energy transfer rate with respect to a second efficiency threshold value, the second efficiency threshold value being lower than the first efficiency threshold value.

In an embodiment, the method further comprises adjusting efficiency threshold values for the efficiency constraint, using a flow rate of a fluid flowing on a primary side of the thermal energy exchanger, a flow speed of the fluid on the primary side of the thermal energy exchanger, a flow rate of a fluid flowing on a secondary side of the thermal energy exchanger, a flow speed of the fluid on the secondary side of the thermal energy exchanger, a temperature of the fluid on the secondary side of the thermal energy exchanger, a humidity of the fluid on the secondary side of the thermal energy exchanger, and/or an entropy of the fluid on the secondary side of the thermal energy exchanger.

In an embodiment, the override signal is generated, if controlling the orifice of the valve in the first mode of operation does not attain the demand value within a determined first duration of time.

In an embodiment, the override signal is cancelled, if controlling the orifice of the valve in the second mode of operation has attained the demand value for a determined second duration of time.

In an embodiment, the override signal is generated by an electronic circuit of a thermostat unit comparing a current temperature to a target temperature defined by the demand value.

In an embodiment, regulating the flow of the fluid through the thermal energy exchanger within the efficiency constraints on the energy transfer rate comprises adjusting the orifice of the valve in order to attain the demand value, if the temperature difference $\Delta T=T_{in}-T_{out}$ is at or above the efficiency threshold value, and adjusting the orifice of the valve in order to maintain a current flow of the fluid through the thermal energy exchanger, if the temperature difference $\Delta T=T_{in}-T_{out}$ is below the efficiency threshold value.

In an embodiment, the override signal is indicative of a current flow of the fluid through the thermal energy exchanger below a minimum flow rate threshold, said minimum flow rate threshold being dependent on a temperature of the fluid; and controlling the orifice of the valve in the second mode of operation comprises adjusting the orifice of the valve to increase the flow of the fluid through the thermal energy exchanger.

In an embodiment, the demand value comprises a target temperature, a target orifice of the valve, a control value for the valve, a target flow rate, a target energy transfer rate, and/or a control value for an actuator actuating the valve.

In addition to the method of controlling the orifice of a valve in an HVAC system, the present invention also relates to a control system for controlling an orifice of a valve in an HVAC system to regulate the flow of a fluid through a thermal energy exchanger of the HVAC system and adjust the energy transfer rate of the thermal energy exchanger in response to a demand value. The control system comprises an electronic circuit configured to: control the orifice of the valve in a first mode of operation where the flow of the fluid through the thermal energy exchanger is regulated within efficiency constraints on the energy transfer rate with respect to a first efficiency threshold value, the efficiency constraints being determined by comparing a temperature difference $\Delta T=T_{in}-T_{out}$ between a supply temperature $T_{in}$ of the fluid entering the thermal energy exchanger (2) and a return temperature $T_{out}$ of the fluid exiting the thermal energy exchanger (2), to the first efficiency threshold value; and upon receiving an override signal, control the orifice of the valve in a second mode of operation where the flow of the fluid through the thermal energy exchanger is not regulated with respect to the first efficiency threshold value.

In an embodiment, the electronic circuit is configured to control the orifice of the valve in the second mode of operation by regulating the flow of the fluid through the thermal energy exchanger within the efficiency constraints on the energy transfer rate with respect to a second efficiency threshold value, the second efficiency threshold value being lower than the first efficiency threshold value.

In an embodiment, the electronic circuit is configured to adjust efficiency threshold values for the efficiency constraint, using a flow rate of a fluid flowing on a primary side of the thermal energy exchanger, a flow speed of the fluid on the primary side of the thermal energy exchanger, a flow rate of a fluid flowing on a secondary side of the thermal energy exchanger, a flow speed of the fluid on the secondary side of the thermal energy exchanger, a temperature of the fluid on the secondary side of the thermal energy exchanger, a humidity of the fluid on the secondary side of the thermal energy exchanger, and/or an entropy of the fluid on the secondary side of the thermal energy exchanger.

In an embodiment, the electronic circuit is configured to generate the override signal, if controlling the orifice of the valve in the first mode of operation does not attain the demand value within a determined first duration of time.

In an embodiment, the electronic circuit is configured to cancel the override signal, if controlling the orifice of the valve in the second mode of operation has attained the demand value for a determined second duration of time.

In an embodiment, the electronic circuit is implemented in a thermostat unit and configured to generate the override signal by comparing a current temperature to a target temperature defined by the demand value.

In an embodiment, the electronic circuit is configured to regulate the flow of the fluid through the thermal energy exchanger within the efficiency constraints on the energy transfer rate by adjusting the orifice of the valve in order to attain the demand value, if the temperature difference $\Delta T=T_{in}-T_{out}$ is at or above the efficiency threshold value, and adjust the orifice of the valve in order to maintain a current flow of the fluid through the thermal energy exchanger, if the temperature difference $\Delta T=T_{in}-T_{out}$ is below the efficiency threshold value.

In an embodiment, the electronic circuit is configured to generate the override signal, if a current flow of the fluid through the thermal energy exchanger is below a minimum flow rate threshold, said minimum flow rate threshold being dependent on a temperature of the fluid; and control the orifice of the valve in the second mode of operation by adjusting the orifice of the valve to increase the flow of the fluid through the thermal energy exchanger.

In an embodiment, the electronic circuit is configured to process a demand value comprising a target temperature, a target orifice of the valve, a control value for the valve, a target flow rate, a target energy transfer rate, and/or a control value for an actuator actuating the valve.

Furthermore, the present invention also relates to a computer program product comprising a non-transient computer readable medium having stored thereon computer program code configured to control a processor of a control system, for controlling an orifice of a valve in an HVAC system to regulate the flow of a fluid through a thermal energy exchanger of the HVAC system and adjust the energy transfer rate of the thermal energy exchanger, in response to a demand value, such that the processor executes the steps of: controlling the orifice of the valve in a first mode of operation where the flow of the fluid through the thermal energy exchanger is regulated within efficiency constraints on the energy transfer rate with respect to a first efficiency threshold value, the efficiency constraints being determined by comparing a temperature difference $\Delta T = T_{in} - T_{out}$, between a supply temperature $T_{in}$ of the fluid entering the thermal energy exchanger and a return temperature $T_{out}$ of the fluid exiting the thermal energy exchanger, to the first efficiency threshold value; and, upon receiving an override signal, controlling the orifice of the valve in a second mode of operation where the flow of the fluid through the thermal energy exchanger is not regulated with respect to the first efficiency threshold value.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

Figure 1:
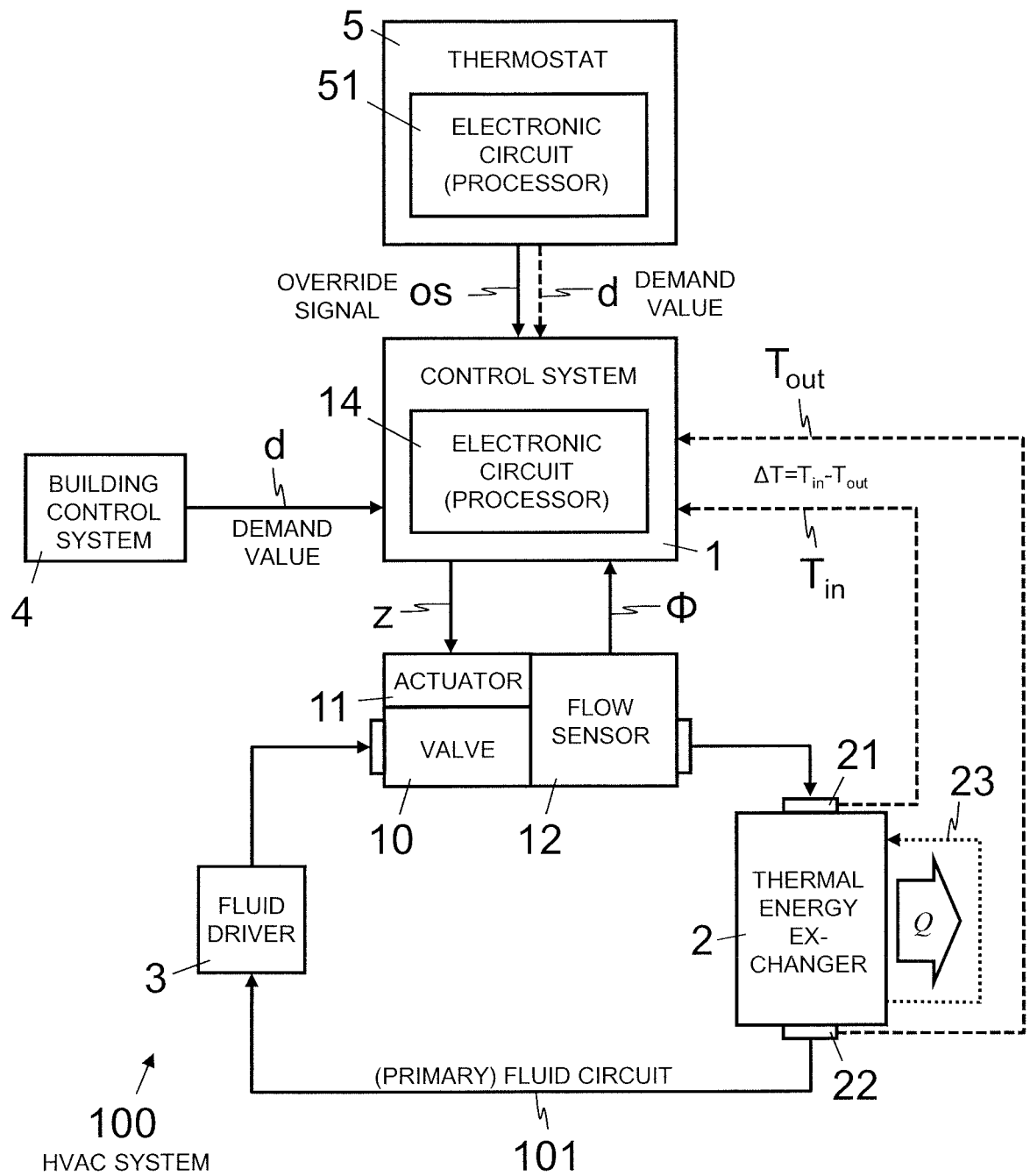
FIG. 1: shows a block diagram illustrating schematically an HVAC system with a fluid circuit comprising a fluid driver, a valve, and a thermal energy exchanger, and a control system for controlling the orifice (opening) of the valve to regulate the flow of a fluid through the thermal energy exchanger and adjust the energy transfer rate of the thermal energy exchanger.

In FIG. 1, reference numeral 100 refers to an HVAC system with a fluid circuit 101 comprising a fluid driver 3, e.g. a pump, a valve 10, a thermal energy exchanger 2, e.g. a heat exchanger for heating or cooling a room, which are interconnected by way of pipes. Depending on the embodiment, the valve is rotary valve, e.g. a ball valve, or a linear valve, e.g. a piston or stem valve. The valve 10 is provided with an actuator 11, e.g. an electrical motor, for opening and closing the valve 10 and thus controlling the orifice of the valve 10 and the flow through the fluid circuit 101, using different positions (or sizes of orifice) of the valve 10. Further, the fluid driver 3 may further vary the flow through the fluid circuit 101. As illustrated schematically, the HVAC system 100 further comprises an optional building control system 4 and/or a thermostat 5 unit with an electronic circuit (processor) 51. One skilled in the art will understand that the depiction of the HVAC system 100 is very simplified and that the HVAC system 100 may include a plurality of fluid circuits 101 (zones), having in each case one or more valves 10, actuators 11, and thermal energy exchangers 2. For example, the fluid is a liquid heat transportation medium such as water and the HVAC system 100 further includes a heater for heating the liquid or a chiller for cooling the liquid.

As illustrated schematically in FIG. 1, the thermal energy exchanger 2 is provided with two temperature sensors 21, 22 arranged at the inlet of the thermal energy exchanger 2, for measuring the supply temperature $T_{in}$ of the fluid entering the thermal energy exchanger 2, and at the exit of the thermal energy exchanger 2, for measuring the return temperature $T_{out}$ of the fluid exiting the thermal energy exchanger 2. One skilled in the art will understand that the temperature sensors 21, 22 may be arranged in different locations, for example, the temperature sensor 21 for measuring the supply temperature $T_{in}$ may be arranged at the valve 10 or at the exit of a heater.

The fluid circuit 101 further comprises a flow sensor 12 for measuring the flow $\Phi$, i.e. the rate of fluid flow, through the valve 10 or fluid circuit 101, respectively. Depending on the embodiment, the flow sensor 12 is arranged in or at the valve 10, or in or at a pipe section connected to the valve 10. For example, the flow sensor 12 is an ultrasonic sensor or a heat transport sensor.

In FIG. 1, reference numeral 1 refers to a control system for controlling the valve 10 or the actuator 11, respectively, to adjust the orifice (opening or position) of the valve 10. Accordingly, the control system 1 regulates the flow $\Phi$, i.e. the rate of fluid flow, through the valve 10 and, thus, through the thermal energy exchanger 2. Consequently, the control system 1 regulates the amount of thermal energy exchanged by the thermal energy exchanger 2 with its environment and thus the energy transfer rate $\dot{Q}$ of the thermal energy exchanger 2. Depending on the embodiment, the control system 1 is arranged at the valve 10, e.g. as an integral part of the valve 10 or attached to the valve 10, or the control system 1 is arranged at a pipe section 12 connected to the valve 10. One skilled in the art will understand that the control system 1 may also be arranged remotely from the valve 10 and actuator 11, communicatively coupled by way of a wired or wireless communication link, e.g. through a wired communication bus, a Local Area Network (LAN), or a Wireless Local Area Network (WLAN).

The control system 1 comprises an electronic circuit 14, e.g. an operational processor (microprocessor) with program and data memory or an application specific integrated circuit (ASIC). The control system 1 comprises computer program code configured to direct the processor 14 or another electronic circuit of the control system 1 to perform various functions, as will be explained later in more detail. The computer program code is stored on a non-transient computer-readable medium which is connected to the control system 1 in a fixed or removable fashion. One skilled in the art will understand, however, that in alternative embodiments, functional modules configured to perform said functions can be implemented partly or fully by way of hardware components. Moreover, in alternative embodiments, the processor 14 is arranged in different components of the HVAC system 100, e.g. in the actuator 11, the flow sensor 12, the thermostat 5, or the building control system 4.

As is illustrated in FIG. 1, the flow sensor 12 is connected to the control system 1 for providing timely or current-time measurement values of the flow (rate) $\Phi$ to the control system 1. Furthermore, the control system 1 is connected to the actuator 11 for supplying control signals z to the actuator 11 for controlling the actuator 11 to open and/or close the valve 10, i.e. to control the electric motor of the actuator 11 to actuate a regulating member of the valve 10 to adjust the orifice (opening or position) of the valve 10.

Moreover, the temperature sensors 21, 22 of the thermal energy exchanger 2 are connected to the control system 1 for providing to the control system 1 timely or current-time measurement values of the supply temperature $T_{in}$ and the return temperature $T_{out}$ of the fluid entering or exiting the thermal energy exchanger 2, respectively.

Depending on the embodiment, the control system 1 is further connected to the building control system 4 and/or the thermostat 5 unit for receiving from the building control system 4 or thermostat 5 control signals and/or demand values, e.g. user or system settings for a target temperature, a target orifice of the valve, a control value for the valve, a target flow rate, a target energy transfer rate, and/or a control value for an actuator or its electric motor actuating the valve.

In an embodiment, the HVAC system 100 further comprises sensors which are arranged in the space where the thermal energy exchanger 2 is located, in the primary fluid circuit 101 (primary side) of the thermal energy exchanger 2, and/or in a secondary circuit 23 (secondary side) of the thermal energy exchanger 2, for example a sensor for measuring the speed of flow of the fluid on the primary side 101 of the thermal energy exchanger 2, a sensor for measuring the speed of flow of a fluid on the secondary side 23 of the thermal energy exchanger 2, a flow sensor for measuring the flow rate of a fluid flowing on the secondary side of the thermal energy exchanger 2, e.g. an air flow sensor, for measuring the air flow across the thermal energy exchanger 2, a temperature sensor for measuring the temperature of the fluid on the secondary side 23 of the thermal energy exchanger 2, e.g. a temperature sensor for measuring the air temperature in the space around the heat exchanger 2, a sensor for measuring the humidity of the fluid on the secondary side 23 of the thermal energy exchanger 2, e.g. a humidity sensor, for measuring the humidity of the air in the room where the thermal energy exchanger 2 is arranged, and/or a sensor for measuring the entropy of the fluid on the secondary side 23 of the thermal energy exchanger 2.

In the following paragraphs, described with reference to FIGS. 2-8 are possible sequences of steps performed by the electronic circuit 14 (processor) of the control system 1 for controlling the orifice (opening or position) of the valve 10 to regulate the flow $\Phi$ through the thermal energy exchanger 2.

Figure 2:
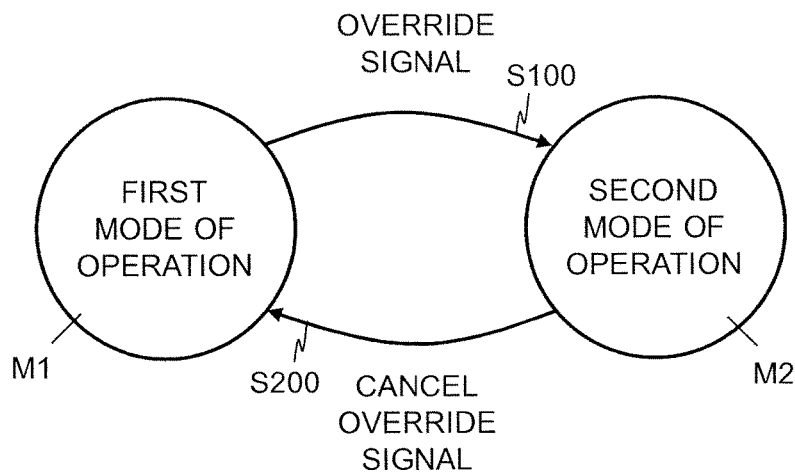
FIG. 2: shows a state diagram illustrating two modes of operation for controlling the orifice of a valve to regulate the flow of a fluid through the thermal energy exchanger and adjust the energy transfer rate of the thermal energy exchanger.

As illustrated in the state diagram of FIG. 2, the control system 1 or its electronic circuit 14 (processor), respectively, has two modes of operation M1, M2 for controlling the orifice of the valve 10 to regulate the flow $\Phi$ of fluid through the thermal energy exchanger 2 and thereby adjust the energy transfer rate $\dot{Q}$ of the thermal energy exchanger 2. The electronic circuit 14 switches from the first mode of operation M1 to the second mode of operation M2 when it receives or generates an override signal OS in step S100. The electronic circuit 14 switches from the second mode of operation M2 to the first mode of operation M1 when the override signal OS is cancelled in step S200. One skilled in the art will understand, that depending on the embodiment the override signal OS is implemented as an actual control signal transmitted through a wired or wireless connection or as a control value in a memory, for example.

Figure 8:
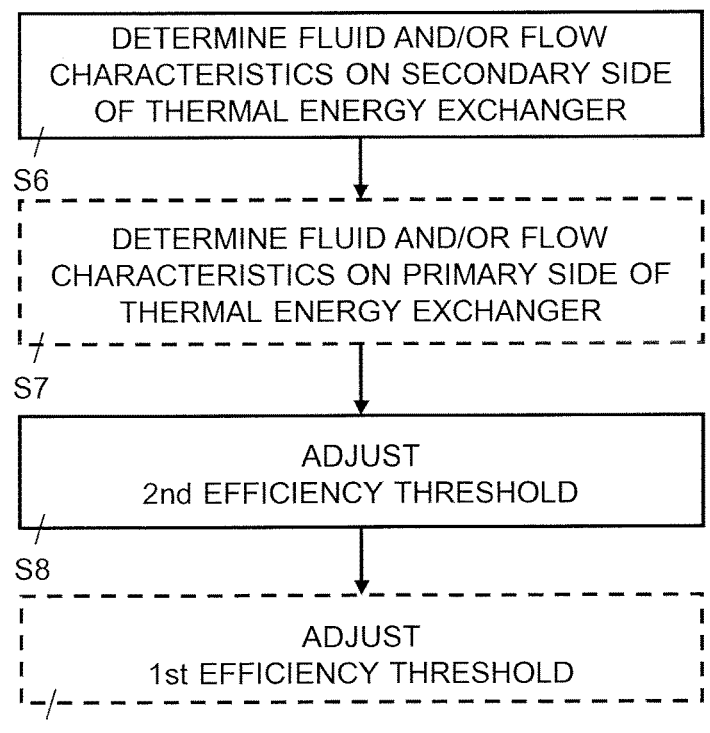
FIG. 8: shows a flow diagram illustrating an exemplary sequence of steps for determining fluid and/or flow characteristics on a primary and/or secondary side of a thermal energy exchanger, and adjusting efficiency threshold values used in controlling the orifice (opening) of a valve to regulate the flow of a fluid through the thermal energy exchanger and adjust the energy transfer rate of the thermal energy exchanger.

In the first mode of operation M1, the electronic circuit 14 regulates the flow $\Phi$ of the fluid through the thermal energy exchanger 2 within efficiency constraints on the energy transfer rate $\dot{Q}$ with respect to a first efficiency threshold $FT_1$ (see FIG. 8).

Figure 3:
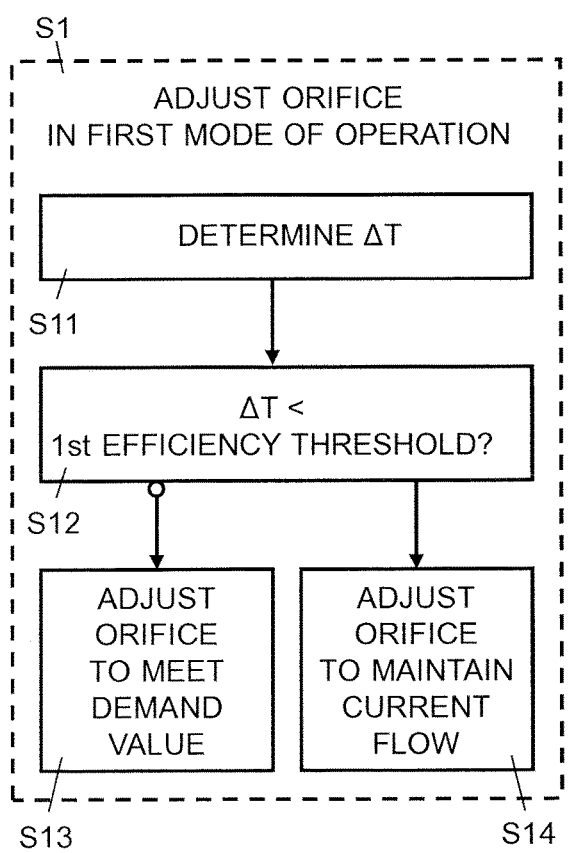
FIG. 3: shows a flow diagram illustrating an exemplary sequence of steps for adjusting the orifice of a valve in a first mode of operation for regulating the flow of a fluid through a thermal energy exchanger.

Accordingly, as illustrated in FIG. 3, in step S1, the electronic circuit 14, respectively, adjusts the orifice of the valve 10 in the first mode of operation M1.

In step S11, the electronic circuit 14 determines the temperature difference $\Delta T = T_{in} - T_{out}$, between the supply temperature $T_{in}$ of the fluid entering the thermal energy exchanger 2, as measured by temperature sensor 21, and the return temperature $T_{out}$ of the fluid exiting the thermal energy exchanger 2, as measured by temperature sensor 22.

In step S21, the electronic circuit 14 compares the temperature difference $\Delta T$ to the first efficiency threshold $FT_1$.

In step S13, if the temperature difference $\Delta T$ is greater than or equal to the first efficiency threshold $FT_1$, the electronic circuit 14 directs the actuator 11 or its electric motor, respectively, to adjust the orifice of the valve 10 to meet a demand value d.

In step S14, if the temperature difference $\Delta T$ is below the first efficiency threshold $FT_1$, the electronic circuit 14 directs the actuator 11 or its electric motor, respectively, to adjust the orifice of the valve 10 to maintain the current flow $\Phi$ of fluid, as measured by the flow sensor 12.

In the second mode of operation M2, the electronic circuit 14 does not regulate the flow $\Phi$ of the fluid through thermal energy exchanger 2 with respect to the first efficiency threshold $FT_1$. Two alternative or combined embodiments of regulating the flow $\Phi$ of fluid through the thermal energy exchanger 2 in the second mode of operation M2 will be described below with reference to FIGS. 4 and 6, respectively.

Figure 4:
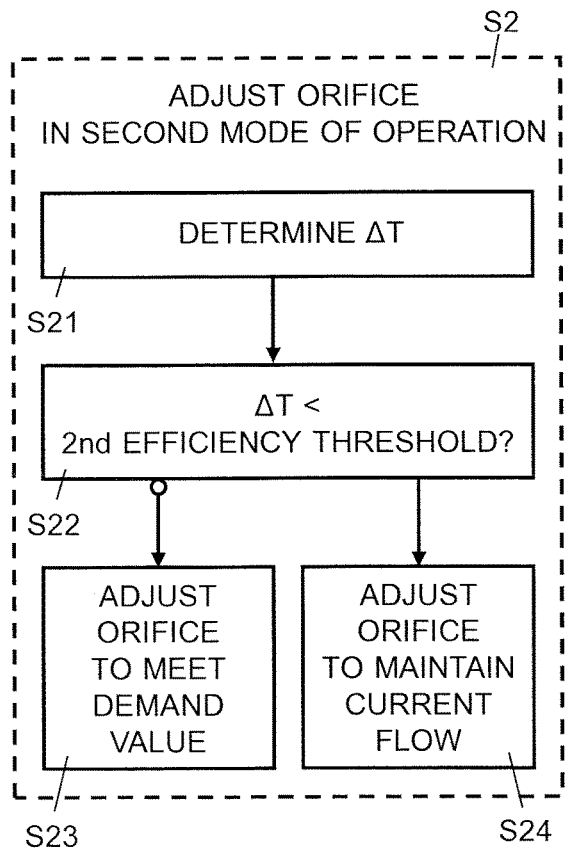
FIG. 4: shows a flow diagram illustrating an exemplary sequence of steps for adjusting the orifice of a valve in a second mode of operation for regulating the flow of a fluid through a thermal energy exchanger.

In a first version of the second mode of operation M2, illustrated in FIG. 4, the electronic circuit 14 regulates the flow $\Phi$ of the fluid through the thermal energy exchanger 2 within efficiency constraints on the energy transfer rate $\dot{Q}$ with respect to a second efficiency threshold $FT_2$ (see FIG. 8). A value of zero for the second efficiency threshold $FT_2$ corresponds to have no efficiency constraints on the energy transfer rate $\dot{Q}$.

Accordingly, in step S2, the electronic circuit 14, respectively, adjusts the orifice of the valve 10 in the second mode of operation M2.

In step S21, the electronic circuit 14 determines the temperature difference $\Delta T = T_{in} - T_{out}$, between the supply temperature $T_{in}$ of the fluid entering the thermal energy exchanger 2, as measured by temperature sensor 21, and the return temperature $T_{out}$ of the fluid exiting the thermal energy exchanger 2, as measured by temperature sensor 22.

In step S22, the electronic circuit 14 compares the temperature difference ΔT to the second efficiency threshold $FT_2$.

In step S23, if the temperature difference ΔT is greater than or equal to the second efficiency threshold $FT_2$, the electronic circuit 14 directs the actuator 11 or its electric motor, respectively, to adjust the orifice of the valve 10 to meet a demand value d.

In step S24, if the temperature difference ΔT is below the secondefficiency threshold $FT_2$, the electronic circuit 14 directs the actuator 11 or its electric motor, respectively, to adjust the orifice of the valve 10 to maintain the current flow Φ of fluid, as measured by the flow sensor 12.

Figure 6:
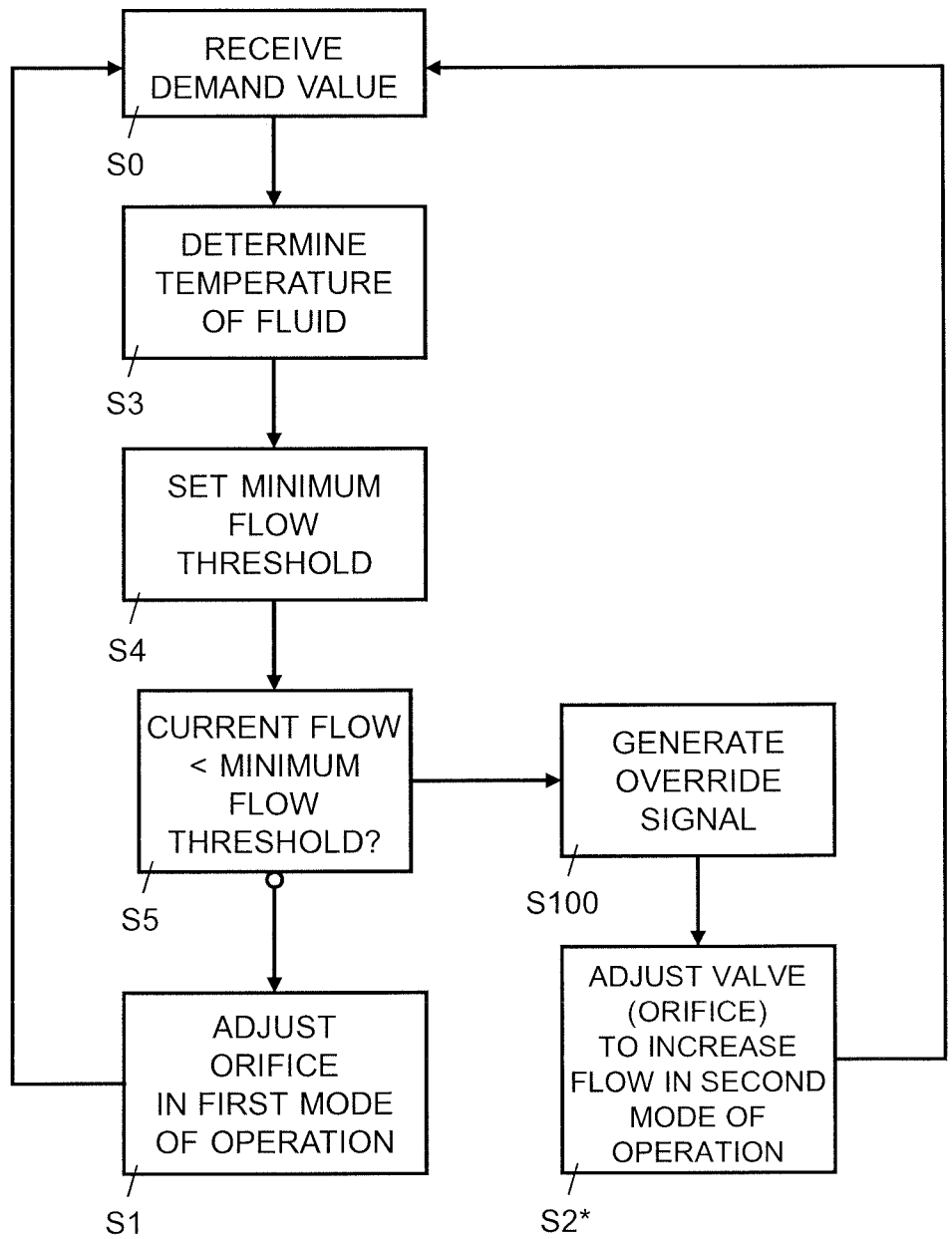
FIG. 6: shows a flow diagram illustrating an exemplary sequence of steps for controlling the orifice (opening) of a valve, in response to a demand value and depending on a temperature of a fluid, for regulating the flow of the fluid through a thermal energy exchanger.

In an alternative or additional (combined) second version of the second mode of operation M2, illustrated in FIG. 6, the electronic circuit 14 adjusts the valve 10 or its orifice, respectively, to increase the flow Φ of the fluid through the thermal energy exchanger 2 in step S2*. This second version of the second mode of operation M2 will be initiated by an override signal OS triggered by different conditions, as will be described later in more detail with reference to FIG. 6.

Figure 5:
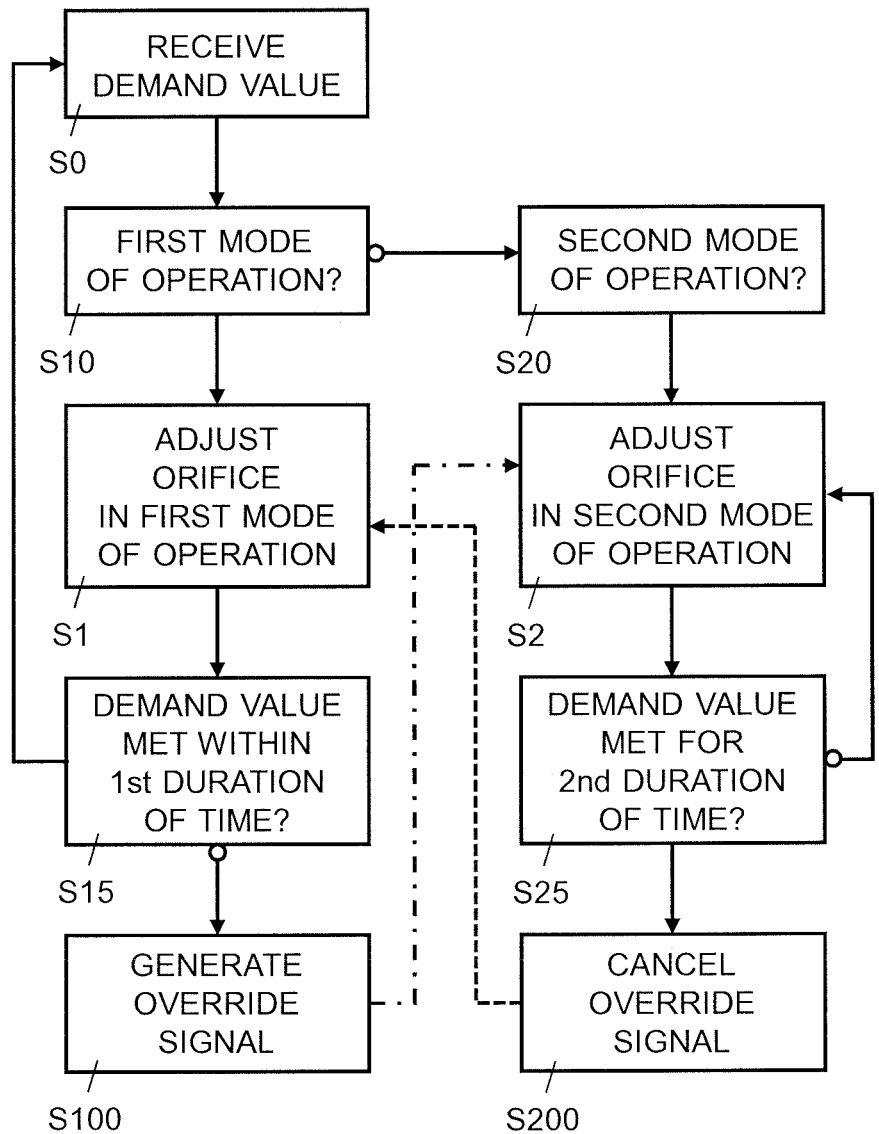
FIG. 5: shows a flow diagram illustrating an exemplary sequence of steps for controlling the orifice (opening) of a valve to regulate the flow of a fluid through a thermal energy exchanger and adjust the energy transfer rate of the thermal energy exchanger, in response to a demand value.

FIG. 5 illustrates an exemplary sequence of steps for controlling the orifice (opening) of the valve 10 to regulate the flow Φ of fluid through the thermal energy exchanger 2 in response to a demand value d, for adjusting the energy transfer rate $\dot{Q}$ of the thermal energy exchanger 2.

In step S0, the electronic circuit 14 receives a demand value d, e.g. from the building control system 4 or thermostat 5 or another external unit.

If the electronic circuit 14 is in the first mode of operation M1, as indicated schematically by step S10, the electronic circuit 14 adjusts the orifice of the valve 10 in step S1 in the first mode of operation M1, as described above with reference to FIG. 3.

In step S15, it is checked whether the demand value d was met within a defined duration of time, depending on the demand value d, this may be a duration of a few minutes, e.g. ten to fifteen minutes, or a longer duration of more than fifteen minutes, e.g. twenty to thirty minutes. If the demand value d was met within the expected time, the demanded value d is maintained and processing continues in step S0.

If the demand value d was not met within the expected time, an override signal OS is generated in step S100. Generating the override signal OS may further be conditioned on the setting of an override mode, e.g. per configuration or user activation, e.g. through a user interface of the thermostat 5 unit. Consequently, the electronic circuit 14 of the control system 1 continues processing in the second mode of operation M2 by adjusting the orifice of the valve 10 in step S2 in the second mode of operation M2, as described above with reference to FIG. 4.

Depending on the embodiment and/or configuration, the checking of step S15 and/or the generating of the override signal OS in step S100 are executed by the electronic circuit 14 of the control system 1 or by the electronic circuit 51 (processor) of the thermostat 5 or of another external unit that initiated the respective demand. For example, the electronic circuit 51 of the thermostat 5 compares a current temperature, e.g. a current room temperature or a current temperature of supply air, to a target temperature defined by the demand value d for deciding whether or not to generate the override signal OS.

If the electronic circuit 14 is in the second mode of operation M2, upon receiving the demand value d, as indicated schematically by step S20, the electronic circuit 14 adjusts the orifice of the valve 10 in step S2 in the second mode of operation M2, as described above with reference to FIG. 4.

In step S25, the electronic circuit 14 checks whether the demand value d was met during a defined duration of time, depending on the demand value d, this may be a duration of one or more hours, e.g. one to two hours, or a longer duration of more than two hours, e.g. three to four hours. If the demand value d was not met for the defined duration of time, the electronic circuit 14 continues processing in step S2.

If the demand value d was met for the defined duration of time or a defined maximum override time is exceeded, the electronic circuit 14 cancels the override signal OS in step S200. Consequently, the electronic circuit 14 of the control system 1 continues processing in the first mode of operation M1 by adjusting the orifice of the valve 10 in step S1 in the first mode of operation M1, as described above with reference to FIG. 3.

FIG. 6 illustrates an exemplary sequence of steps for controlling the orifice (opening) of the valve 10 to regulate the flow Φ of fluid through the thermal energy exchanger 2 in response to a demand value d and depending on the temperature of the fluid, as measured by a temperature sensor 21, 22 arranged in the primary fluid circuit 101.

In step S0, the electronic circuit 14 receives a demand value d, e.g. from the building control system 4 or thermostat 5 or another external unit.

In step S3, the electronic circuit 14 determines the temperature of the fluid in the primary fluid circuit 101.

In step S4, the electronic circuit 14 sets a minimum flow threshold depending on the temperature of the fluid in the primary fluid circuit 101. The minimum flow threshold is set depending on the type of fluid, such that the fluid does not freeze at the current temperature of the fluid in the primary fluid circuit 101.

In step S5, the electronic circuit 14 checks whether the current flow rate Φ of the fluid, as measured by flow sensor 12, is below the minimum flow threshold. If the current flow rate Φ is not below the minimum flow threshold, the electronic circuit 14 continues processing in the first mode of operation M1 by adjusting the orifice of the valve 10 in step S1 in the first mode of operation M1, as described above with reference to FIG. 3.

Otherwise, if the current flow rate Φ is below the minimum flow threshold, the electronic circuit 14 generates an override signal OS in step S100 for triggering the second version of the second mode of operation M2.

Consequently, in step S2*, the electronic circuit 14 adjusts the valve 10 or its orifice, respectively, to increase the flow Φ of the fluid through the thermal energy exchanger 2 in the second version of the second mode of operation M2, such as to prevent the fluid from freezing at the current temperature of the fluid in the primary fluid circuit 101.

Figure 7:
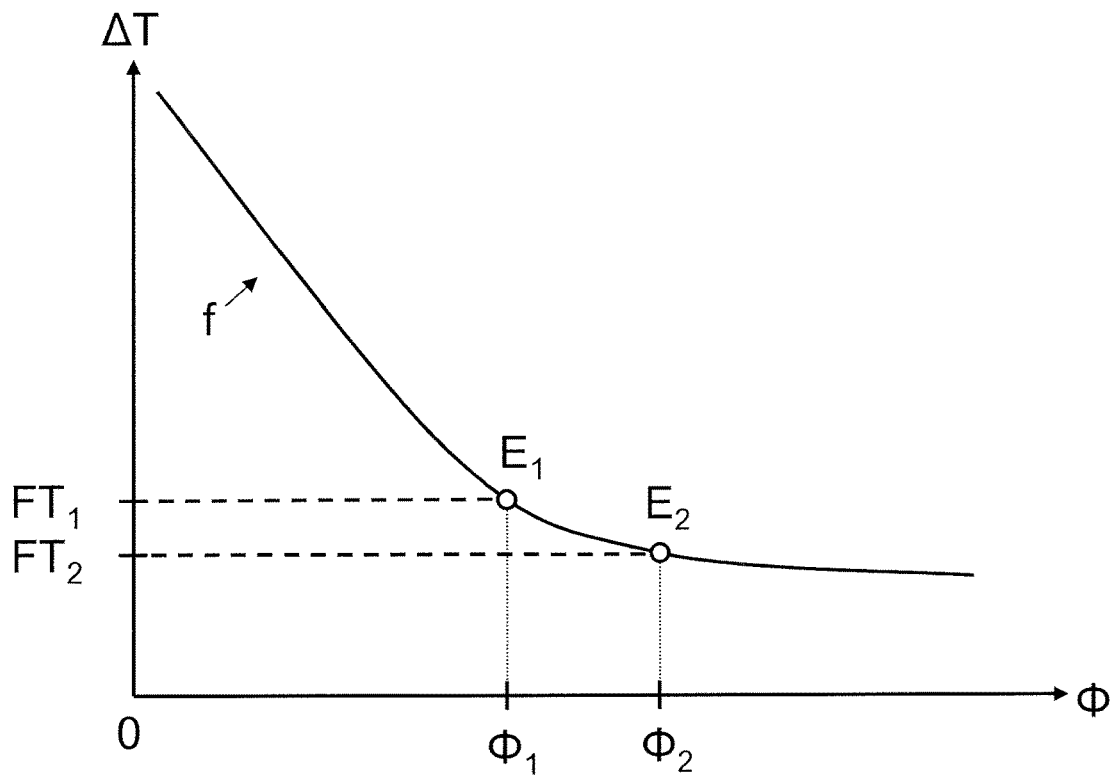
FIG. 7: shows a graph illustrating an example of a temperature-difference-per-flow curve with different efficiency threshold values used in controlling the orifice (opening or position) of a valve to regulate the flow of a fluid through a thermal energy exchanger and adjust the energy transfer rate of the thermal energy exchanger.

FIG. 7 shows an example of a temperature-difference-per-flow curve ΔT=f (Φ) indicating the energy E=ΔT·Φ transfer (and corresponding energy transfer rate $\dot{Q}$) achieved depending on the flow rate Φ of the fluid through the thermal energy exchanger 2, specifically, $E_1=FT_1·\Phi_1$ with flow rate $\Phi_1$ and a resulting temperature difference ΔT corresponding to the first efficiency threshold $FT_1$, and $E_2=FT_2·\Phi_2$ with flow rate $\Phi_2$ and a resulting temperature difference ΔT corresponding to the second efficiency threshold $FT_2$. As shown in FIG. 7, the value of the first efficiency threshold $FT_1$ is higher than the value of the second efficiency threshold $FT_2$, such that efficiency constraints with respect to the first efficiency threshold $FT_1$ demand a higher energy transfer rate $\dot{Q}$ than efficiency constraints with respect to the second efficiency threshold $FT_2$.

FIG. 8 shows an exemplary sequence of steps for adjusting the efficiency thresholds $FT_1$, $FT_2$ depending on one or more fluid and/or flow characteristics on the primary and/or secondary sides 23, 101 of the thermal energy exchanger 2. The efficiency thresholds $FT_1$, $FT_2$ are adjusted on a periodic basis and/or per request from the building control system 4 or a user, e.g. via a user interface of the thermostat 5.

In step S6, the electronic circuit 14 determines one or more fluid and/or flow characteristics on the secondary side 23 of the thermal energy exchanger 2, including the flow rate of the fluid flowing on the secondary side 23, e.g. the air flow across the thermal energy exchanger 2, the temperature of the fluid on the secondary side 23, e.g. the air temperature in the space around the heat exchanger 2, the humidity of the fluid on the secondary side 23, e.g. the humidity of the air in the room where the thermal energy exchanger 2 is arranged, and/or the entropy of the fluid on the secondary side 23.

In (optional) step S7, the electronic circuit 14 determines one or more fluid and/or flow characteristics on the primary side 101 of the thermal energy exchanger 2, including the speed of flow of the fluid in the primary fluid circuit 101, and/or the flow rate of the fluid flowing in the primary fluid circuit 101.

In step S8, the electronic circuit 14 adjusts the second efficiency threshold $FT_2$ depending on the one or more fluid and/or flow characteristics on the secondary side 23 of the thermal energy exchanger 2 and/or on the primary side 101 of the thermal energy exchanger 2.

In (optional) step S9, the electronic circuit 14 adjusts the first efficiency threshold $FT_1$ depending on the one or more fluid and/or flow characteristics on the secondary side 23 of the thermal energy exchanger 2 and/or on the primary side 101 of the thermal energy exchanger 2.

It should be noted that, in the description, the sequence of the steps has been presented in a specific order, one skilled in the art will understand, however, that the computer program code may be structured differently and that the order of at least some of the steps could be altered, without deviating from the scope of the invention.

The invention claimed is:

1. A method of controlling an orifice of a valve in an HVAC system to regulate the flow of a fluid through a thermal energy exchanger of the HVAC system and adjust an energy transfer rate of the thermal energy exchanger in response to a demand value, the method comprising:
controlling the orifice of the valve in a first mode of operation where the flow of the fluid through the thermal energy exchanger is regulated within efficiency constraints on the energy transfer rate with respect to a first efficiency threshold value, the efficiency constraints being determined by comparing a temperature difference, between a supply temperature of the fluid entering the thermal energy exchanger and a return temperature of the fluid exiting the thermal energy exchanger, to the first efficiency threshold value, adjusting the orifice of the valve in order to attain the demand value, if the temperature difference is at or above the first efficiency threshold value, and adjusting the orifice of the valve in order to maintain a current flow of the fluid through the thermal energy exchanger, if the temperature difference is below the first efficiency threshold value;
generating an override signal when the first mode of operation does not obtain the demand value within a first duration of time; and
upon receiving the override signal, controlling the orifice of the valve in a second mode of operation where the flow of the fluid through the thermal energy exchanger is regulated within the efficiency constraints on the energy transfer rate with respect to a second efficiency threshold value, the second efficiency threshold value being lower than the first efficiency threshold value, adjusting the orifice of the valve in order to attain the demand value, if the temperature difference is at or above the second efficiency threshold value, and adjusting the orifice of the valve in order to maintain a current flow of the fluid through the thermal energy exchanger, if the temperature difference is below the second efficiency threshold value.

2. The method of claim 1, wherein the method further comprises adjusting efficiency threshold values for the efficiency constraint, using at least one of: a flow rate of a fluid flowing on a primary side of the thermal energy exchanger, a flow speed of the fluid on the primary side of the thermal energy exchanger, a flow rate of a fluid flowing on a secondary side of the thermal energy exchanger, a flow speed of the fluid on the secondary side of the thermal energy exchanger, a temperature of the fluid on the secondary side of the thermal energy exchanger, a humidity of the fluid on the secondary side of the thermal energy exchanger, and an entropy of the fluid on the secondary side of the thermal energy exchanger.

3. The method of claim 1, wherein the method comprises cancelling the override signal, if controlling the orifice of the valve in the second mode of operation has attained the demand value for a determined second duration of time.

4. The method of claim 1, wherein the override signal is generated by an electronic circuit of a thermostat unit comparing a current temperature to a target temperature defined by the demand value.

5. The method of claim 1, wherein the override signal is indicative of a current flow of the fluid through the thermal energy exchanger below a minimum flow rate threshold, said minimum flow rate threshold being dependent on a temperature of the fluid; and controlling the orifice of the valve in the second mode of operation comprises adjusting the orifice of the valve to increase the flow of the fluid through the thermal energy exchanger.

6. The method of claim 1, wherein the demand value comprises at least one of: a target temperature, a target orifice of the valve (10), a control value for the valve, a target flow rate, a target energy transfer rate, and a control value for an actuator actuating the valve.

7. A control system for controlling an orifice of a valve in an HVAC system to regulate the flow of a fluid through a thermal energy exchanger of the HVAC system and adjust an energy transfer rate of the thermal energy exchanger in response to a demand value, the control system comprising an electronic circuit configured to:
control the orifice of the valve in a first mode of operation where the flow of the fluid through the thermal energy exchanger is regulated within efficiency constraints on the energy transfer rate with respect to a first efficiency threshold value, the efficiency constraints being determined by comparing a temperature difference, between a supply temperature of the fluid entering the thermal energy exchanger and a return temperature of the fluid exiting the thermal energy exchanger, to the first efficiency threshold value, adjusting the orifice of the valve in order to attain the demand value, if the temperature difference is at or above the first efficiency threshold value, and adjusting the orifice of the valve in order to maintain a current flow of the fluid through the thermal energy exchanger, if the temperature difference is below the first efficiency threshold value;

generate an override signal when the first mode of operation does not obtain the demand value within a first duration of time; and upon receiving the override signal, control the orifice of the valve in a second mode of operation where the flow of the fluid through the thermal energy exchanger is regulated within the efficiency constraints on the energy transfer rate with respect to a second efficiency threshold value, the second efficiency threshold value being lower than the first efficiency threshold value, adjusting the orifice of the valve in order to attain the demand value, if the temperature difference is at or above the second efficiency threshold value, and adjusting the orifice of the valve in order to maintain a current flow of the fluid through the thermal energy exchanger, if the temperature difference is below the second efficiency threshold value.

8. The control system of claim 7, wherein the electronic circuit is configured to adjust efficiency threshold values for the efficiency constraint, using at least one of: a flow rate of a fluid flowing on a primary side of the thermal energy exchanger, a flow speed of the fluid on the primary side of the thermal energy exchanger, a flow rate of a fluid flowing on a secondary side of the thermal energy exchanger, a flow speed of the fluid on the secondary side of the thermal energy exchanger, a temperature of the fluid on the secondary side of the thermal energy exchanger, a humidity of the fluid on the secondary side of the thermal energy exchanger, and an entropy of the fluid on the secondary side of the thermal energy exchanger.

9. The control system of claim 7, wherein the electronic circuit is configured to cancel the override signal, if controlling the orifice of the valve in the second mode of operation has attained the demand value for a determined second duration of time.

10. The control system of claim 7, wherein the electronic circuit is implemented in a thermostat unit and configured to generate the override signal by comparing a current temperature to a target temperature defined by the demand value.

11. The control system of claim 7, wherein the electronic circuit is configured to generate the override signal, if a current flow of the fluid through the thermal energy exchanger is below a minimum flow rate threshold, said minimum flow rate threshold being dependent on a temperature of the fluid; and control the orifice of the valve in the second mode of operation by adjusting the orifice of the valve to increase the flow of the fluid through the thermal energy exchanger.

12. The control system of claim 7, wherein the electronic circuit is configured to process a demand value comprising at least one of: a target temperature, a target orifice of the valve, a control value for the valve, a target flow rate, a target energy transfer rate, and a control value for an actuator actuating the valve.

13. A non-transitory computer readable-medium having stored thereon computer program code configured to control a processor of a control system, for controlling an orifice of a valve in an HVAC system to regulate the flow of a fluid through a thermal energy exchanger of the HVAC system and adjust an energy transfer rate of the thermal energy exchanger, in response to a demand value, such that the processor executes the steps of:

controlling the orifice of the valve in a first mode of operation where the flow of the fluid through the thermal energy exchanger is regulated within efficiency constraints on the energy transfer rate with respect to a first efficiency threshold value, the efficiency constraints being determined by comparing a temperature difference, between a supply temperature of the fluid entering the thermal energy exchanger and a return temperature of the fluid exiting the thermal energy exchanger, to the first efficiency threshold value, adjusting the orifice of the valve in order to attain the demand value, if the temperature difference is at or above the first efficiency threshold value, and adjusting the orifice of the valve in order to maintain a current flow of the fluid through the thermal energy exchanger, if the temperature difference is below the first efficiency threshold value;

generating an override signal when the first mode of operation does not obtain the demand value within a first duration of time; and upon receiving the override signal, controlling the orifice of the valve in a second mode of operation where the flow of the fluid through the thermal energy exchanger is regulated within the efficiency constraints on the energy transfer rate with respect to a second efficiency threshold value, the second efficiency threshold value being lower than the first efficiency threshold value, adjusting the orifice of the valve in order to attain the demand value, if the temperature difference is at or above the second efficiency threshold value, and adjusting the orifice of the valve in order to maintain a current flow of the fluid through the thermal energy exchanger, if the temperature difference is below the second efficiency threshold value.

* * * * *